US012596481B2

(12) United States Patent
Mukherjee

(10) Patent No.: US 12,596,481 B2
(45) Date of Patent: Apr. 7, 2026

(54) PREFETCHING DATA USING PREDICTIVE ANALYSIS

(71) Applicant: Cohesity, Inc., San Jose, CA (US)

(72) Inventor: Sourav Mukherjee, Bangalore (IN)

(73) Assignee: Cohesity, Inc., Santa Clara, CA (US)

( * ) Notice: Subject to any disclaimer, the term of this patent is extended or adjusted under 35 U.S.C. 154(b) by 0 days.

(21) Appl. No.: 18/634,288

(22) Filed: Apr. 12, 2024

(65) Prior Publication Data

US 2025/0321674 A1     Oct. 16, 2025

(51) Int. Cl.
*G06F 3/00* (2006.01)
*G06F 3/06* (2006.01)
(52) U.S. Cl.
CPC .......... *G06F 3/0611* (2013.01); *G06F 3/0635* (2013.01); *G06F 3/067* (2013.01)
(58) Field of Classification Search
CPC ....... G06F 3/0611; G06F 3/0635; G06F 3/067
See application file for complete search history.

(56) References Cited

U.S. PATENT DOCUMENTS

| 11,061,586 B1 * | 7/2021 | Ahuja ...................... G06F 3/067 |
| 2012/0072672 A1 * | 3/2012 | Anderson ........... G06F 12/0897 |
| | | 711/E12.017 |

| 2016/0381176 A1 | 12/2016 | Cherubini et al. |
| 2022/0092022 A1 * | 3/2022 | Agarwal ............... G06F 16/113 |
| 2024/0256414 A1 * | 8/2024 | Dar ..................... G06F 11/3058 |

OTHER PUBLICATIONS

U.S. Appl. No. 17/960,515, filed Oct. 5, 2022, naming inventors Lee et al.
Extended Search Report from counterpart European Application No. 24187814.9 dated Jan. 8, 2025, 10 pp.
Herodotou et al., "Automating Distributed Tiered Storage Management in Cluster Computing", arXiv, arXiv:1907.02394v1, Jul. 4, 2019, 16 pp.

* cited by examiner

*Primary Examiner* — Craig S Goldschmidt
(74) *Attorney, Agent, or Firm* — Shumaker & Sieffert, P.A.

(57) ABSTRACT

Techniques are disclosed for prefetching data using predictive analysis. An example method comprises storing, by a data platform implemented by a computing system, objects of a file system, wherein a first subset of the objects is stored to a first storage tier and a second subset of the objects is stored to a second storage tier, classifying objects into one or more classifications, storing a data access record for the objects, applying a machine learning model to generate a prediction of future data access to one or more objects of the second subset based on the one or more classifications and the data access record, wherein the prediction includes a predicted time for the future data access, and retrieving, based on the prediction, the one or more objects of the second subset from the second storage tier prior to the predicted time.

20 Claims, 6 Drawing Sheets

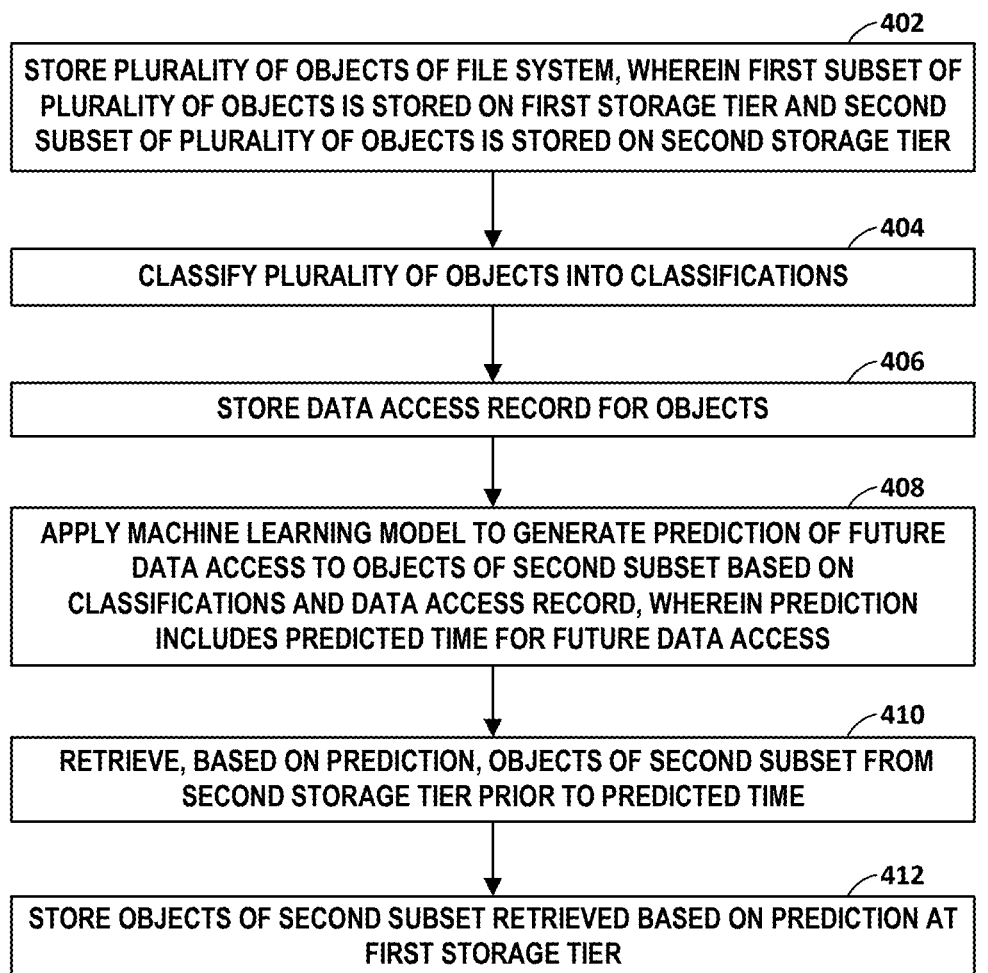

┌─ 402
STORE PLURALITY OF OBJECTS OF FILE SYSTEM, WHEREIN FIRST SUBSET OF PLURALITY OF OBJECTS IS STORED ON FIRST STORAGE TIER AND SECOND SUBSET OF PLURALITY OF OBJECTS IS STORED ON SECOND STORAGE TIER

┌─ 404
CLASSIFY PLURALITY OF OBJECTS INTO CLASSIFICATIONS

┌─ 406
STORE DATA ACCESS RECORD FOR OBJECTS

┌─ 408
APPLY MACHINE LEARNING MODEL TO GENERATE PREDICTION OF FUTURE DATA ACCESS TO OBJECTS OF SECOND SUBSET BASED ON CLASSIFICATIONS AND DATA ACCESS RECORD, WHEREIN PREDICTION INCLUDES PREDICTED TIME FOR FUTURE DATA ACCESS

┌─ 410
RETRIEVE, BASED ON PREDICTION, OBJECTS OF SECOND SUBSET FROM SECOND STORAGE TIER PRIOR TO PREDICTED TIME

┌─ 412
STORE OBJECTS OF SECOND SUBSET RETRIEVED BASED ON PREDICTION AT FIRST STORAGE TIER

FIG. 4

PREFETCHING DATA USING PREDICTIVE ANALYSIS

TECHNICAL FIELD

This disclosure relates to data platforms for computing systems.

BACKGROUND

Data platforms that support computing applications rely on primary storage systems to support latency sensitive applications. However, because primary storage is often more difficult or expensive to scale, a secondary storage system is often relied upon to support secondary use cases such as backup and archive.

SUMMARY

Aspects of this disclosure describe techniques for prefetching data using predictive analysis. Some systems store data, such as file system data (e.g., files, virtual machine volumes, pods, containers) on different storage tiers, such as a primary storage tier and a secondary storage tier. Storage tiers may be distinguished by performance characteristics. For example, some storage tiers may have higher performance (e.g., higher data communication bandwidth and/or throughput) and accordingly require less time to retrieve data relative to other storage tiers. For instance, the primary storage tier may be a higher performance hot storage tier and have higher performance and the secondary storage tier may be a lower performance cold storage tier and have relatively lower performance. As such, in this example, retrieving data from the primary storage tier may require less time than retrieving the data from the secondary storage tier.

In general, service providers charge higher fees for storage tiers with higher performance and lower fees for storage tiers with lower performance. To reduce these monetary costs some systems may "down-tier" data by storing at least some data on lower performance storage tiers. For example, infrequently accessed data may be stored on a cold storage tier (e.g., object storage such as AMAZON® Simple Storage Service (S3®)) by AMAZON, INC. while more frequently accessed data may be stored on a hot storage tier (e.g., solid state drives (SSDs), hard disk drives (HDDs)). Though monetary costs may be reduced in such manner, use of lower performance storage tiers results in increased data retrieval times. In some cases, the increased retrieval time may significantly delay or disrupt users that require the data. When lower tiered data (e.g., data stored on a lower performance storage tier) is requested, the lower tiered data may be "up-tiered" (e.g., moved) from the lower performance storage tier (e.g., the cold storage tier) to the higher performance storage tier (e.g., the hot storage tier). Up-tiering may reduce monetary costs by allowing data to be stored for some time in the lower performance tier (e.g., when not in use by users) but does not reduce data retrieval times associated with the lower performance storage tiers.

The techniques described herein provide prefetching of data using predictive analysis. Rather than causing users to access data from lower performance storage tiers (e.g., cold storage performance tiers) or "up-tiering" the data when accessed by users, a data platform configured in accordance with the described techniques may prefetch data from a secondary storage tier such that the data is available for use (e.g., store on a primary storage tier) by a particular time.

For example, a data platform may prefetch the data by retrieving the data based on a prediction indicating when the data will be accessed at future time. In some examples, the data platform may prefetch data from the secondary storage tier and store the data at a primary storage tier based on a prediction that the data will be accessed at a predicted time. The data platform may train and/or apply one or more machine learning ("ML") models to generate the prediction.

Various aspects of the techniques may enable the data platform to determine a type or classification for data (e.g., files) and store data access records. The data platform may train the ML model using data access records, including these classifications, and apply the ML model to generate the prediction indicating when data should be prefetched. For example, the ML model may be trained to infer when a particular classification of data (e.g., payroll data) will be accessed by users in the future based on training data including the data access record. The data platform may then prefetch the data from the secondary storage tier based on the prediction such that the data is available on the primary storage tier when predicted to be required by users.

The described techniques may provide one or more technical advantages that realize a practical application. For example, the described techniques improve perceived latency with respect to data stored on lower performance storage tiers (e.g., cold storage). For instance, rather than waiting for data to be retrieved from the secondary storage tier, in accordance with the described techniques, the data may be prefetched such that the data is available on a primary storage tier by the time the data is required for use. Moreover, in accordance with the described techniques, system load (e.g., computing resource or bandwidth consumption) may be managed to avoid periods of high or excess system load by avoiding transferring data to a primary storage tier on demand (e.g., up-tiering). For example, the data platform may determine a transfer rate with an acceptable system load that ensures the data is available (e.g., accessible) on a primary storage tier by the predicted time and prefetch data from the secondary storage tier over time according to the transfer rate.

In one example, this disclosure describes a method comprising storing, by a data platform implemented by a computing system, a plurality of objects of a file system, wherein a first subset of the plurality of objects is stored to a first storage tier and a second subset of the plurality of objects is stored to a second storage tier, classifying, by the data platform, the plurality of objects into one or more classifications, storing, by the data platform, a data access record for the plurality of objects, applying, by the data platform, a machine learning model to generate a prediction of future data access to one or more objects of the second subset based on the one or more classifications and the data access record, wherein the prediction includes a predicted time for the future data access, retrieving, by the data platform and based on the prediction, the one or more objects of the second subset from the second storage tier prior to the predicted time, and storing, by the data platform and to the first storage tier, the one or more objects of the second subset retrieved based on the prediction.

In another example, this disclosure describes a computing system comprising a memory storing instructions, and processing circuitry that executes the instructions to: store a plurality of objects of a file system, wherein a first subset of the plurality of objects is stored to a first storage tier and a second subset of the plurality of objects is stored to a second storage tier, classify, the plurality of objects into one or more classifications, store a data access record for the plurality of objects, apply a machine learning model to generate a prediction of future data access to one or more objects of the second subset based on the one or more classifications and the data access record, wherein the prediction includes a predicted time for the future data access, retrieve, based on the prediction, the one or more objects of the second subset from the second storage tier prior to the predicted time, and store, to the first storage tier, the one or more objects of the second subset retrieved based on the prediction.

In another example, this disclosure describes a computer-readable storage medium comprising instructions that, when executed, cause processing circuitry of a computing system to: store a plurality of objects of a file system, wherein a first subset of the plurality of objects is stored to a first storage tier and a second subset of the plurality of objects is stored to a second storage tier, classify the plurality of objects into one or more classifications, store a data access record for the plurality of objects, apply a machine learning model to generate a prediction of future data access to one or more objects of the second subset based on the one or more classifications and the data access record, wherein the prediction includes a predicted time for the future data access, retrieve, based on the prediction, the one or more objects of the second subset from the second storage tier prior to the predicted time, and store, to the first storage tier, the one or more objects of the second subset retrieved based on the prediction.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 4 is a flow chart illustrating an example operation of a data platform performing prefetching of data using predictive analysis, in accordance with the techniques of this disclosure.

Like reference characters denote like elements throughout the text and figures.

DETAILED DESCRIPTION

Figure 1A:
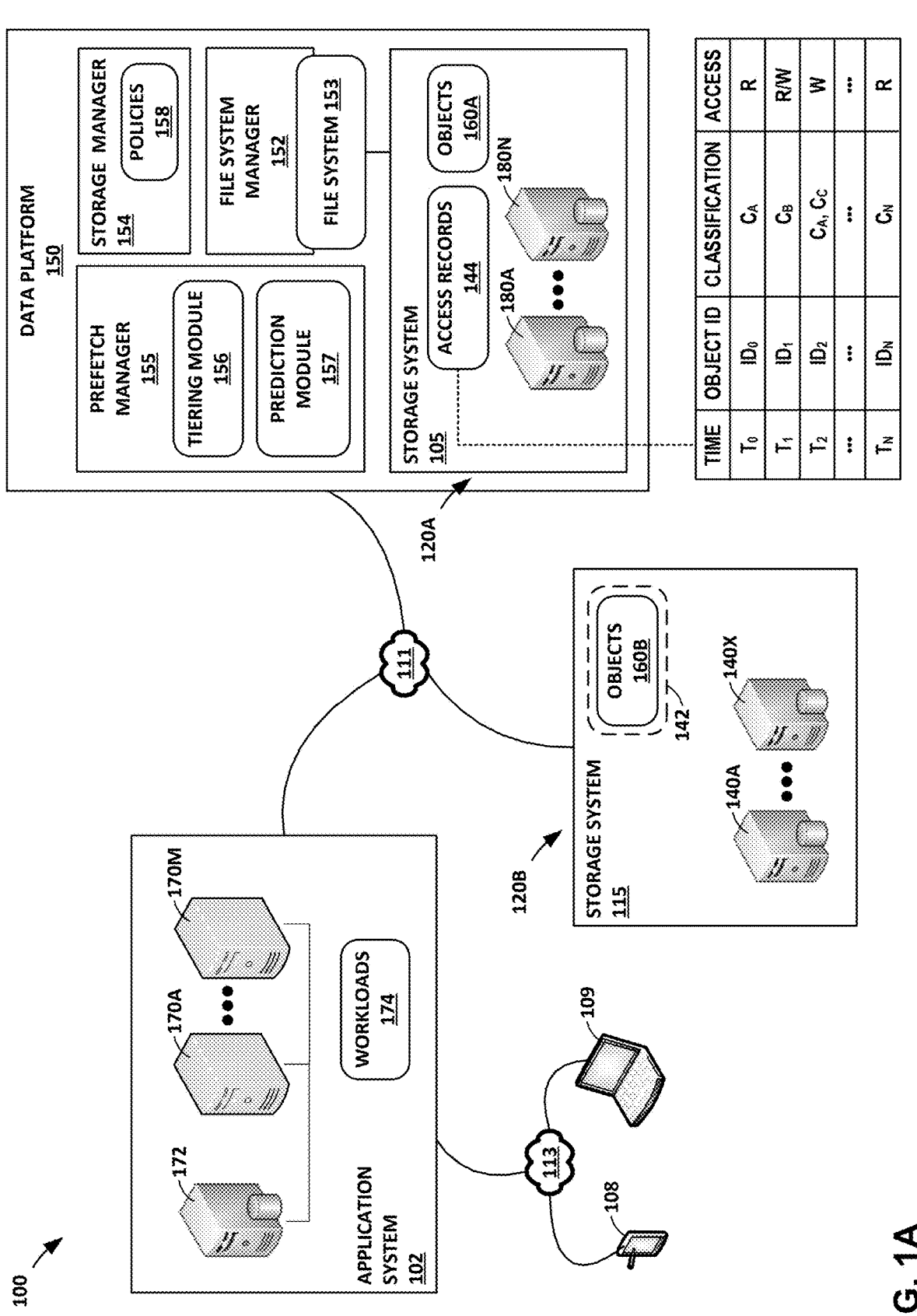
FIGS. 1A-1B are block diagrams illustrating example systems that perform prefetching of data using predictive analysis, in accordance with techniques of this disclosure.
Figure 1B:
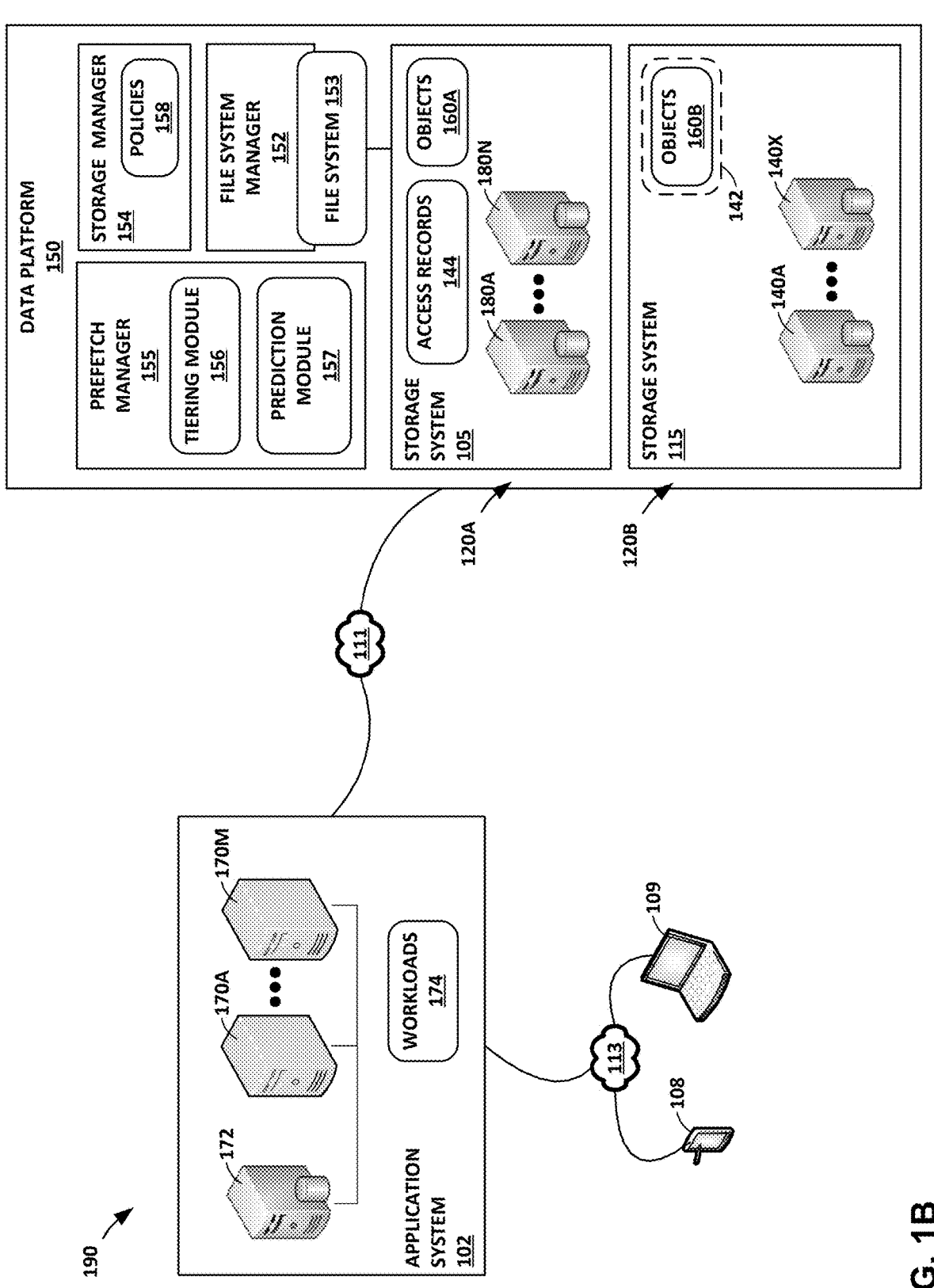

FIGS. 1A-1B are block diagrams illustrating example systems that prefetch data using predictive analysis, in accordance with one or more aspects of the present disclosure. In the example of FIG. 1A, system 100 includes application system 102. Application system 102 represents a collection of hardware devices, software components, and/or data stores that can be used to implement one or more applications or services provided to one or more mobile devices 108 and one or more client devices 109 via a network 113. Application system 102 may include one or more physical or virtual computing devices that execute workloads 174 for the applications or services. Workloads 174 may include one or more virtual machines, containers, Kubernetes pods each including one or more containers, bare metal processes, and/or other types of workloads.

In the example of FIG. 1A, application system 102 includes application servers 170A-170M (collectively, "application servers 170") that may include or be connected with a database server implementing a database. Other examples of application system 102 may include one or more load balancers, web servers, network devices such as switches or gateways, or other devices for implementing and delivering one or more applications or services to mobile devices 108 and client devices 109. Application system 102 may include one or more file servers. The one or more file servers may implement a primary file system for application system 102. (In such instances, file system 153 may be a secondary file system that provides tiered storage, backup, archive, and/or other services for the primary file system. Reference herein to a file system may include a primary file system or secondary file system, e.g., a primary file system for application system 102 or file system 153 operating as either a primary file system or a secondary file system.)

Application system 102 may be located on premises and/or in one or more data centers, with each data center being a part of a public, private, or hybrid cloud. The applications or services may be distributed applications. The applications or services may support enterprise software, financial software, office or other productivity software, data analysis software, customer relationship management, web services, educational software, database software, multimedia software, information technology, health care software, or other type of applications or services. The applications or services may be provided as a service (-aaS) for Software-aaS (SaaS), Platform-aaS (PaaS), Infrastructure-aaS (IaaS), Data Storage-aas (dSaaS), or other type of service.

In some examples, application system 102 may represent an enterprise system that includes one or more workstations in the form of desktop computers, laptop computers, mobile devices, enterprise servers, network devices, and other hardware to support enterprise applications. Enterprise applications may include enterprise software, financial software, office or other productivity software, data analysis software, customer relationship management, web services, educational software, database software, multimedia software, information technology, health care software, or other type of applications. Enterprise applications may be delivered as a service from external cloud service providers or other providers, executed natively on application system 102, or both.

In the example of FIG. 1A, system 100 includes a data platform 150 that may provide a file system 153 and backup functions to an application system 102, using storage system 105 and one or more separate storage systems 115. Data platform 150 implements a distributed file system 153 and a storage architecture to facilitate access by application system 102 to file system data and to facilitate the transfer of data between storage system 105 and application system 102 via network 111. With the distributed file system, data platform 150 enables devices of application system 102 to access file system data, via network 111 using a communication protocol, as if such file system data was stored locally (e.g., to a hard disk of a device of application system 102). Example communication protocols for accessing files and objects include Server Message Block (SMB), Network File System (NFS), or AMAZON Simple Storage Service (S3). File system 153 may be a primary file system or secondary file system for application system 102.

File system manager 152 represents a collection of hardware devices and software components that implements file system 153 for data platform 150. Examples of file system functions provided by the file system manager 152 include storage space management including deduplication, file naming, directory management, metadata management, partitioning, and access control. File system manager 152 executes a communication protocol to facilitate access via network 111 by application system 102 to files and objects stored to storage system 105.

Data platform 150 includes storage system 105 having one or more storage devices 180A-180N (collectively, "storage devices 180"). Storage devices 180 may represent one or more physical or virtual compute and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support data platform 150. Different storage devices of storage devices 180 may have a different mix of types of storage media. Each of storage devices 180 may include system memory. Each of storage devices 180 may be a storage server, a network-attached storage (NAS) device, or may represent disk storage for a compute device. Storage system 105 may be a redundant array of independent disks (RAID) system. In some examples, one or more of storage devices 180 are both compute and storage devices that execute software for data platform 150, such as file system manager 152, storage manager 154, and prefetch manager 155 in the example of system 100, and store objects and metadata for data platform 150 to storage media. In some examples, separate compute devices (not shown) execute software for data platform 150, such as file system manager 152, storage manager 154, and prefetch manager 155 in the example of system 100. Each of storage devices 180 may be considered and referred to as a "storage node" or simply as a "node". Storage devices 180 may represent virtual machines running on a supported hypervisor, a cloud virtual machine, a physical rack server, or a compute model installed in a converged platform.

In various examples, data platform 150 runs on physical systems, virtually, or natively in the cloud. For instance, data platform 150 may be deployed as a physical cluster, a virtual cluster, or a cloud-based cluster running in a private, hybrid private/public, or public cloud deployed by a cloud service provider. In some examples of system 100, multiple instances of data platform 150 may be deployed, and file system 153 may be replicated among the various instances. In some cases, data platform 150 is a compute cluster that represents a single management domain. The number of storage devices 180 may be scaled to meet performance needs.

Data platform 150 may implement and offer multiple storage domains to one or more tenants or to segregate workloads 174 that require different data policies. A storage domain is a data policy domain that determines policies for deduplication, compression, encryption, tiering, and other operations performed with respect to objects stored using the storage domain. In this way, data platform 150 may offer users the flexibility to choose global data policies or workload specific data policies. Data platform 150 may support partitioning.

A view is a protocol export that resides within a storage domain. A view inherits data policies from its storage domain, though additional data policies may be specified for the view. Views can be exported via SMB, NFS, S3, and/or another communication protocol. Policies that determine data processing and storage by data platform 150 may be assigned at the view level. A tiering policy 158 may specify a tiering frequency (e.g., frequency at which file system data is distributed and stored on different storage tiers 120). For example, tiering policy may specify a backup frequency and a retention policy, which may include a data lock period. Backups 142 created in accordance with tiering policy 158 inherit the data lock period and retention period specified by tiering policy 158.

Each of network 113 and network 111 may be the internet or may include or represent any public or private communications network or other network. For instance, network 113 may be a cellular, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 113 or network 111 using any suitable communication techniques. Each of network 113 or network 111 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/storage devices or systems). Each of the devices or systems illustrated in FIGS. 1A-1B may be operatively coupled to network 113 and/or network 111 using one or more network links. The links coupling such devices or systems to network 113 and/or network 111 may be Ethernet, Asynchronous Transfer Mode (ATM) or other types of network connections, and such connections may be wireless and/or wired connections. One or more of the devices or systems illustrated in FIGS. 1A-1B or otherwise on network 113 and/or network 111 may be in a remote location relative to one or more other illustrated devices or systems.

Application system 102, using file system 153 provided by data platform 150, generates objects and other data that file system manager 152 creates, manages, and causes to be stored to storage system 105. For this reason, application system 102 may alternatively be referred to as a "source system," file system 153 for application system 102 may alternatively be referred to as a "source file system," and storage system 105 may alternatively be referred to as a "source storage system." Application system 102 may for some purposes communicate directly with storage system 105 via network 111 to transfer objects, and for some purposes communicate with file system manager 152 via network 111 to obtain objects 160 or metadata indirectly from storage system 105. File system manager 152 generates and stores metadata to storage system 105. The collection of data stored to storage system 105 and used to implement file system 153 is referred to herein as file system data. File system data may include the aforementioned metadata and objects 160. Metadata may include file system objects, tables, trees, or other data structures; metadata generated to support deduplication; or metadata to support snapshots. Objects 160 that are stored may include files, virtual machines, databases, applications, pods, container, any of workloads 174, system images, directory information, or other types of objects used by application system 102. Objects 160 of different types and objects of a same type may be deduplicated with respect to one another.

Data platform 150 includes storage manager 154 that may tier file system data for file system 153 by storing subsets or portions of file system data (e.g., objects 160) on different storage tiers 120. For example, data platform 150 may store a plurality of objects 160 storing file system data where a first subset of the plurality of objects 160A is stored on a first storage tier (e.g., primary storage tier 120A) and a second subset of the plurality of objects 160B is stored on a second storage tier (e.g., secondary storage tier 120B). In some examples, storage manager 154 may store lower tier data (e.g., less frequently used file system data) as objects 160B at storage system 115 of a secondary storage tier 120B and store higher tier data (e.g., more frequently used file system data) as objects 160A at storage system 105 of a primary storage tier 120A. For instance, storage manager 154 may store higher tier data comprising more frequently accessed data (e.g., objects 160 accessed on a daily or weekly basis) or more recently accessed data (e.g., objects 160 accessed within a period of 7 days) on a higher performance storage tier (e.g., primary storage tier 120A) and store lower tier data comprising less frequently accessed data (e.g., objects 160 accessed on a monthly or quarterly basis) or data accessed less recently (e.g., objects 160 access more than 7 days ago) on a lower performance storage tier (e.g., secondary storage tier 120B).

In some examples, storage manager 154 may store backups 142 or archives as objects 160B at storage system 115 on secondary storage tier 120B. Objects 160B of backups 142 may be less frequently accessed (e.g., accessed monthly) as compared to other objects 160. Storage manager 154 may store more frequently accessed objects 160A (e.g., files in daily use) at storage system 105 on primary storage tier 120A. Storage manager 154 may store objects 160, stored by storage system 105, to one or more storage systems 115 and vice versa via network 111. As shown by the broken line depiction of backups 142, in some examples, storage manager 154 may store objects 160 without backups 142. For example, storage manager 154 may store objects 160 that are standalone objects 160 independent from any backup 142 or archive.

As shown in FIGS. 1A-1B, primary storage tier 120A may comprise storage system 105 and secondary storage tier 120B may comprise storage system 115. Storage tiers 120 may differ in performance characteristics. For example, primary storage tier 120A may have higher performance than secondary storage tier 120B. For instance, storage system 105 may have a higher data transfer rate (e.g., higher bandwidth) or higher processing capability (e.g., faster processors) relative to storage system 115. As such, secondary storage tier 120B may be a lower performance storage tier and a storage provider may charge reduced fees to store data on secondary storage tier 120B as compared to higher performance storage tiers (e.g., primary storage tier 120A). In some examples, to achieve higher performance, storage system 105 may comprise higher performing storage devices 180 and/or processing hardware (e.g., processors) relative to storage devices 140 and/or processing hardware of storage system 115, in some examples. For instance, storage devices 180 may comprise one or more SSDs and storage devices 140 may comprise one or more HDDs. In some examples, primary storage tier 120A may be referred to as a hot storage tier while secondary storage tier 120B may be referred to as a cold storage tier.

Storage system 115 includes one or more storage devices 140A-140X (collectively, "storage devices 140"). Storage devices 140 may represent one or more physical or virtual compute and/or storage devices that include or otherwise have access to storage media. Such storage media may include one or more of Flash drives, solid state drives (SSDs), hard disk drives (HDDs), optical discs, forms of electrically programmable memories (EPROM) or electrically erasable and programmable (EEPROM) memories, and/or other types of storage media. Different storage devices of storage devices 140 may have a different mix of types of storage media. Each of storage devices 140 may include system memory. Each of storage devices 140 may be a storage server, a network-attached storage (NAS) device, or may represent disk storage for a compute device. Storage system 115 may include redundant array of independent disks (RAID) system. Storage system 115 may be capable of storing much larger amounts of data than storage system 105. Storage devices 140 may further be configured for long-term storage of information more suitable for archival purposes.

In some examples, storage system 105 and/or 115 may be a storage system deployed at and managed by a cloud storage provider and referred to as a "cloud storage system." Example cloud storage providers include, e.g., AMAZON WEB SERVICES (AWS™) by AMAZON, INC., AZURE® by MICROSOFT, INC., DROPBOX™ by DROPBOX, INC., ORACLE CLOUD™ by ORACLE, INC., and GOOGLE CLOUD PLATFORM (GCP) by GOOGLE, INC. In some examples, storage system 115 is co-located with storage system 105 in a data center, on-prem, or in a private, public, or hybrid private/public cloud. Storage system 115 may be referred to as an "external target" for tiering file system data. For example, storage system 115 may be an external target for lower tier data such as backups 142, objects 160B, or both. Where deployed and managed by a cloud storage provider, storage system 115 may be referred to as "cloud storage." Storage system 115 may include one or more interfaces for managing transfer of data between storage system 105 and storage system 115 and/or between application system 102 and storage system 115. Data platform 150 that supports application system 102 relies on storage system 105 to support latency sensitive applications. For example, storage system 105 may constitute a higher performance storage tier, such as hot or primary storage tier 120A which may be for higher tier data. However, because storage system 105 is often more difficult or expensive to scale, data platform 150 may use storage system 115 to support use cases such as storing less frequently used file system data which may be for backups 142, archives, or other lower tier data. In general, a file system backup is a copy of file system 153 to support protecting file system 153 for quick recovery and a file system archive ("archive") is a copy of file system 153 to support longer term retention and review. The "copy" of file system 153 may include such data as is needed to retrieve or view file system 153 in its state at the time of the backup or archive. In some examples, file system data stored in backup 142, archive, or other copy on secondary storage tier 120B may be removed (e.g., deleted) from primary storage tier 120A, such as to preserve or lower storage utilization at primary storage tier 120A, which may often be more difficult or expensive to scale as compared to secondary storage tier 120B.

Storage manager 154 may backup (e.g., tier) file system data for file system 153 at any time in accordance with tiering policies 158 that specify, for example, backup periodicity and timing (daily, weekly, etc.), which file system data is to be stored, a backup retention period, storage location, access control, and so forth. An initial backup 142 of file system data corresponds to a state of the file system data at an initial backup time (the backup creation time of the initial backup). Initial backup 142 may include a full backup of the file system data or may include less than a full backup of the file system data, in accordance with tiering policies 158. For example, the initial backup may include all objects 160 of file system 153 or one or more selected objects of file system 153. Any objects 160 stored in backup 142 on secondary storage tier 120B may be removed (e.g., deleted) from primary storage tier 120A, such as to preserve or lower storage utilization at primary storage tier 120A.

One or more subsequent incremental backups 142 of the file system 153 may correspond to respective states of the file system 153 at respective subsequent backup creation times, i.e., after the backup creation time corresponding to the initial backup. A subsequent backup 142 may include an incremental backup of file system 153. A subsequent backup may correspond to an incremental backup of one or more objects of file system 153. Some of the file system data for file system 153 stored on storage system 105 at the initial backup creation time may also be stored on storage system 105 at the subsequent backup creation times. A subsequent incremental backup may include data that was not previously stored to storage system 115. File system data that is included in a subsequent backup may be deduplicated by storage manager 154 against file system data that is included in one or more previous backups, including the initial backup, to reduce the amount of storage used. (Reference to a "time" in this disclosure may refer to dates and/or times. Times may be associated with dates. Multiple backups may occur at different times on the same date, for instance.)

Prefetch manager 155 may store one or more data access records 144, classify data into one or more classifications or types (e.g., human resources data, payroll data, billing data, virtual machine data), or both. For example, prefetch manager 155 may store data access requests (e.g., read/write requests) received at data platform 150, such as from application system 102, mobile devices 108, or client devices 109, in data access record 144. In some examples, data platform 150 may receive a data access request, from application system 120 or client device 109, indicating particular objects 160 (e.g., files) to be accessed (e.g., read, written to, or both). Prefetch manager 155 may store data access requests in data access record 144, such as on storage system 105. Prefetch manager 155 may generate data access record 144 in this manner. In some examples, prefetch manager 155 may store an access time, representing a time associated with the request (e.g., the time of the request), for each data access request in data access record 144.

Prediction module 157 of prefetch manager 155 may classify objects 160 into one or more data types or classifications (e.g., payroll data, personnel data, document data, research data). Prediction module 157 classify objects 160 independent from or in connection with data access requests. For example, prediction module 157 may monitor creation or changes to objects 160 stored on primary storage tier 120A or secondary storage tier 120B and classify objects 160 in response to such activity. Prediction module 157 may periodically classify objects 160 in some examples. Prediction module 157 may classify objects 160 identified in data access requests into one or more classifications. Prediction module 157 may store data access record 144 such that data access record 144 includes data access requests for objects 160 along with an indication of one or more classifications for objects 160 (e.g., a classification of the data identified in the data access request).

In some examples, prediction module 157 may include one or more ML models which prediction module 157 may apply to classify file system data, such as objects 160, into various classifications. For instance, prediction module 157 may apply a data classification ML model that identifies at least one classification (e.g., payroll data, personnel data, document data, research data) for objects 160. A data classification ML model may utilize various machine learning algorithms or techniques (e.g., Naive Bayes, support vector matrix, random forest, linear regression, k nearest neighbors (kNN), boosting, k-means, support vector machines (SVM), and Bayesian inference algorithms or techniques). and be trained utilizing various techniques including supervised or unsupervised learning techniques. The data classification ML model may be a statistical model such as a Markov chain based prediction model. In some examples, the data classification ML model may be trained to classify data based on various characteristics of the data, such as the creation date, creator/source of data (e.g., payroll team), and other tags or identifiers.

Prediction module 157 may store the classifications of objects 160 in data access record 144. For example, for a data access request identifying an object 160, prediction module 157 may classify object 160 in a particular classification (e.g., payroll data). Prediction module 157 may store the data access request in data access record 144 along with an indication of the classification (e.g., payroll data) for the identified object 160. In some examples, prediction module 157 may classify some objects 160 into multiple classifications (e.g., payroll data and personnel data). As such, prediction module 157 may store data access record 144 including multiple classifications for some objects 160 identified in data access record 144. Prediction module 157 may store an indication of a confidence level indicating the level of confidence prediction module 157 has in making a particular classification along with each classification in data access record 144.

FIG. 1A illustrates an example of data access record 144. In some examples, data access record 144 may include a time, data reference or identifier (e.g., object ID), classification, and data access type for one or more data access requests. In the example of FIG. 1A, data access requests for times $t_0$ to $t_n$ are shown. An entry of data access record 144 may include a time to (e.g., 1:00 PM), a data reference or identifier $ID_0$ (e.g., a filename or other object identifier), classification $C_a$ (e.g., payroll data), and a data access type (e.g., read access, write access, read/write access). The time may indicate a time of the data access request, the data reference may be a pointer or other identifier/reference to an object 160, and the classification may indicate a classification or type for the data of object 160 (e.g., payroll data, personnel data, document data, research data). As described above, prediction module 157 may generate a classification based on the source of the data, such as the user, department, or group that created the data. For instance, prediction module 157 may classify object 160 as payroll data if object 160 was created by a user assigned to the payroll department and classify another object 160 as research data when such object 160 was created by a user assigned to the research department. The data access type may identify a type of data access for the data access request. For instance, in the example of FIG. 1A, "R" (e.g., read access), "R/W" (e.g., read/write access), and "W" (e.g., write access) are shown as data access types.

As can be seen by data access request at time $t_2$, prefetch manager 155 may store multiple classifications for object 160 identified in a particular data access request. In some examples, classifications for objects 160 may be stored separate from data access record 144, such as in a separate classification table, database, or record, which may be indexed based on objects 160 (e.g., object IDs). As such, prefetch manager 155 may retrieve one or more classifications for individual objects 160, such as based on the identifier of object 160 (e.g., object ID) rather than storing the classifications in data access record 144.

Prediction module 157 may include one or more ML models trained to generate a prediction of future data access using at least data access record 144. For example, data platform 150 may apply a ML model to generate a prediction including a predicted time indicating a future data access to a subset of objects 160, such as one or more of objects 160B stored on secondary storage tier 120B. A data access prediction ML model may utilize various machine learning algorithms (e.g., Naive Bayes, support vector matrix, random forest, linear regression, k nearest neighbors (kNN), boosting, k-means, support vector machines (SVM), and Bayesian inference algorithms or techniques) and be trained utilizing various techniques including supervised or unsupervised learning. The data access prediction ML model may be a statistical model such as a Markov chain based prediction model.

In some examples, the ML model may be trained, using data access record 144, to infer that a particular classification of data (e.g., payroll data, personnel data, document data, research data) will be accessed at a predicted time. For instance, data access record 144 may contain data access requests from which an inference, that payroll data (e.g., income tax data) is frequently accessed at the end of the last month of a financial quarter (e.g., the fourth week of the month), can be made. As such, prediction module 157, trained with data access record 144, may infer that a future data access request for payroll data will likely occur at a predicted time (e.g., forth week of the last month of any financial quarter). Based on the inference, prediction module 157 may generate and output a prediction indicating that a future data access request for a particular classification of data is likely to be made at a predicted time. Continuing the above example for instance, prediction module 157 may generate and output a prediction that payroll data will be accessed in the future at the fourth week of the last month of the financial quarter (e.g., the predicted time).

An ML model of prediction module 157 may be trained with data access record 144 to generate various predictions. For example, a ML model may be trained with data access record 144 to generate predictions identifying a future data access request for particular objects 160 (e.g., files), in addition or instead of classifications of data, is likely to be made at a predicted time in the future. For example, prediction module 157 may generate a prediction that one or more of objects 160B on secondary storage tier 120B are likely to be accessed at a predicted time. In some examples, prediction module 157 may only generate a prediction when a data access request is likely to be made, such as when the prediction of the data access request has a confidence level above a particular confidence level threshold (e.g., 70%).

Prefetch manager 155 may include tiering module 156 that may perform prefetching of data based on predictions generated by prediction module 157. In some examples, tiering module 155 may prefetch data by retrieving a subset of objects 160 storing the data, such as one or more of objects 160B stored on storage system 115 of secondary storage tier 120B. Tiering module 155 may store such subset of objects 160B prefetched from storage system 115 (the "prefetched objects 160") of secondary storage tier 120B on storage system 105 of primary storage tier 120A. Tiering module 155 may prefetch objects 160 based on the predicted time, such as to ensure objects 160 are substantially or completely retrieved and stored on primary storage tier 120A at least by the predicted time. Continuing the above example for instance, tiering module 156 may retrieve one or more of objects 160B storing payroll data from secondary storage tier 120B during the third week of the month such that such objects 160 are stored and available for access on primary storage tier 120A by the fourth week of the month (e.g., by the predicted time). In this manner, prefetch manager 155 reduces latency in accessing data by prefetching data from secondary storage tier 120B to primary storage tier 120A at least by the predicted time. As described above, primary storage tier 120A may be a higher performance storage tier as compared to secondary storage tier 120B.

Tiering module 156 may determine an amount of transfer time required to retrieve the data from secondary storage tier 120B. For example, tiering module 156 may determine the transfer time based on performance characteristics (e.g., data transfer rate) of the storage tier on which the desired data is stored (e.g., secondary storage tier 120B) and begin to prefetch one or more of objects 160B (that store the desired data) based on the determined amount of time to ensure the data is available at a higher performance storage tier (e.g., primary storage tier 120A) at least by the predicted time. For instance, if tiering module 156 determines the amount of transfer time for a particular 5 terabytes (TBs) of data (e.g., objects 160) on secondary storage tier 120B is 11 hours at 1 gigabit per second (1 GBps), tiering module 156 may begin prefetching objects 160 at least 11 hours before the predicted time of future data access so that such objects 160 may be transferred to (e.g., retrieved and stored on) primary storage tier 120A at least by the predicted time. As such, rather than causing a period of high system load by up-tiering data, prefetch module 155 may maintain a lower level of resource consumption (e.g., bandwidth consumption) by prefetching the data over time based on the predicted time.

In some examples, tiering module 156 may prefetch data based on a desired or predefined level of resource consumption. For instance, tiering module 156 may determine the amount of transfer time based on a predetermined amount (e.g., maximum amount) of resource consumption (e.g., bandwidth consumption) and begin prefetching data based on the amount transfer time such that the data is transferred to primary storage tier 120A at least by the predicted time. To illustrate, if tiering module 156 determines an amount of transfer time for a requested 5 TBs of data (e.g., objects 160) at a desired level of resource consumption (e.g., 500 megabits per second (500 Mbps)) is 22 hours, tiering module 156 may begin prefetching objects 160 at least 22 hours before the predicted time so that objects 160 from secondary storage tier 120B may be transferred to primary storage tier 120A at least by the predicted time. In this manner, prefetch manager 155 may enhance overall performance of system 100 both by avoiding up-tiering and controlling resource consumption (e.g., limiting resource consumption to a predefined maximum amount).

Data platform 150, such as via storage manager 154, may re-tier (e.g., return) prefetched data to a storage tier. For example, to return prefetched objects 160 stored on primary storage tier 120A, storage manager 154 may store prefetched objects 160 on secondary storage tier 120B and remove prefetched objects 160 from primary storage tier 120A. As such, prefetched objects 160 may no longer be stored on primary storage tier 120A and monetary costs associated with storage on primary storage tier 120A may be avoided. In some examples, storage manager 154 may initiate re-tiering of prefetched objects 160 based on various determinations. For instance, storage manager 154 may re-tier prefetched objects 160 after determining prefetched objects 160 have been accessed by users, are no longer in use, after a predetermined period of time, or various subsets thereof.

System 190 of FIG. 1B is a variation of system 100 of FIG. 1A in that data platform 150 stores objects 160, backups 142, or both to backup storage system 115B that is on premises or local to data platform 150. In some examples of system 190, storage system 115 enables users or applications to create, modify, or delete objects 160, backups 142, or both via file system manager 152. In system 190, storage system 105 of FIG. 1B may be the local storage system used by storage manager 154 for initially storing and accumulating objects 160 prior to tiering objects 160 (e.g., backing up objects 160) to storage systems 115. As described further below, storage manager 154 may store objects 160 as data chunks at storage system 105, storage system 115, or both regardless of whether or not storage system 105 is remote or local to data platform 150.

Although some techniques described in this disclosure are described with respect to a backup function performed by a storage manager of a data platform, similar techniques may additionally or alternatively be applied for an archive, replica, clone, or snapshot functions performed by the data platform. In such cases, backups 142 would be archives, replicas, clones, or snapshots, respectively.

Figure 2:
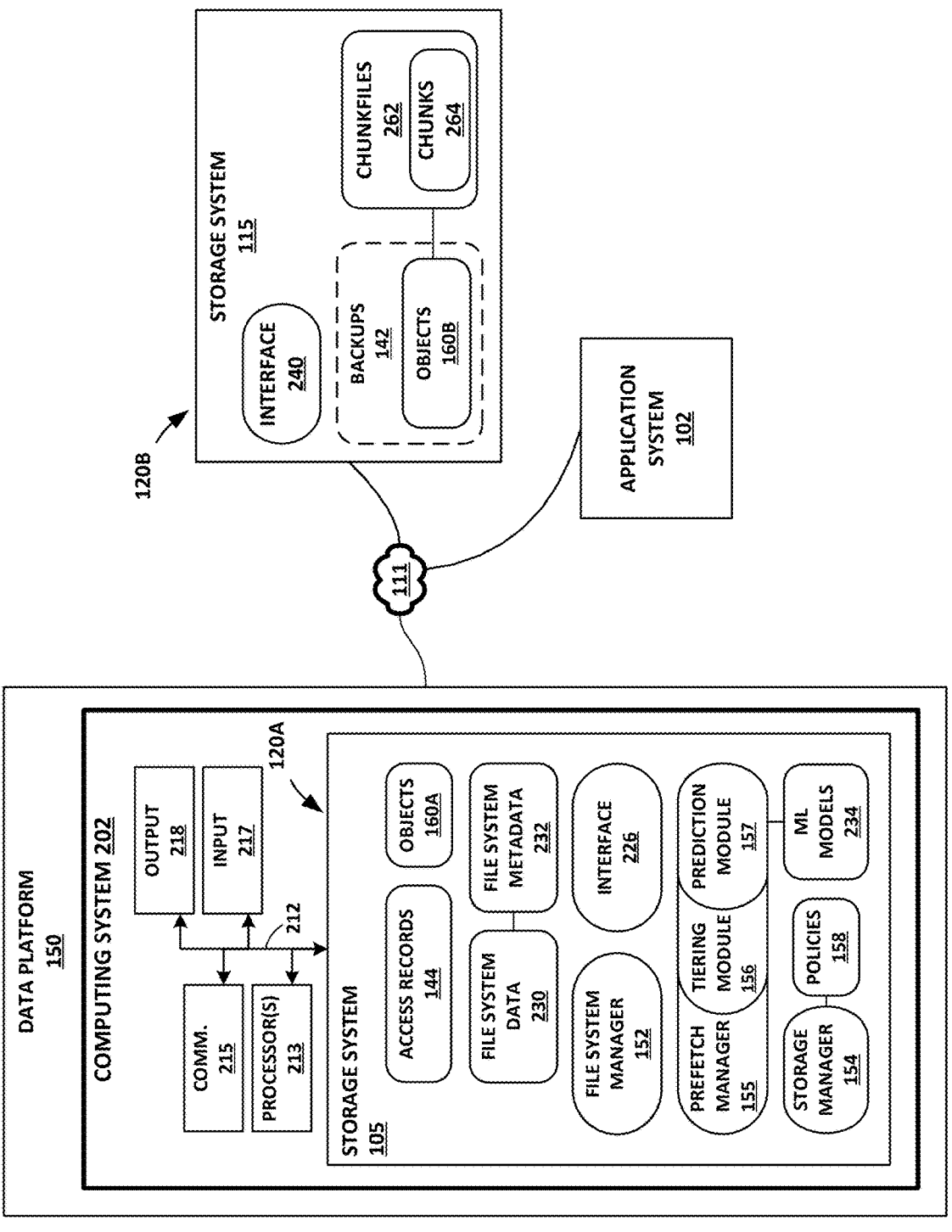
FIG. 2 is a block diagram illustrating an example system that performs prefetching of data using predictive analysis, in accordance with techniques of this disclosure.

FIG. 2 is a block diagram illustrating example system 200, in accordance with techniques of this disclosure. System 200 of FIG. 2 may be described as an example or alternate implementation of system 100 of FIG. 1A or system 190 of FIG. 1B (where objects 160 are written to a local snapshot storage system 115). Storage manager 154 may store file system metadata 232 including references (e.g., pointers) to portions of objects 160 (e.g., chunks 264) at local snapshot storage system 115, as will be described further below. One or more aspects of FIG. 2 may be described herein within the context of FIG. 1A and FIG. 1B.

In the example of FIG. 2, system 200 includes network 111, data platform 150 implemented by computing system 202, and storage system 115 on secondary storage tier 120B. In FIG. 2, network 111, data platform 150, storage system 115, and secondary storage tier 120B may correspond to network 111, data platform 150, storage system 115, and secondary storage tier 120B of FIG. 1A. Although only one storage system 115 is depicted, data platform 150 may apply techniques in accordance with this disclosure using multiple instances of snapshot storage system 115. The different instances of storage system 115 may be deployed by different cloud storage providers, the same cloud storage provider, by an enterprise, or by other entities.

Computing system 202 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 202 represents a cloud computing system, server farm, and/or server cluster (or portion thereof) that provides services to other devices or systems. In other examples, computing system 202 may represent or be implemented through one or more virtualized compute instances (e.g., virtual machines, containers) of a cloud computing system, server farm, data center, and/or server cluster.

In the example of FIG. 2, computing system 202 may include one or more communication units 215, one or more input devices 217, one or more output devices 218, and one or more storage devices of local storage system 105. Local storage system 105 may be on primary storage tier 120A and may include interface module 226, file system manager 152, and tiering policies 158 as well as storage manager 154 and prefetch manager 155. Prefetch manager 155 of FIG. 2 may be an example of prefetch manager 155 of FIG. 1A and include tiering module 156 and prediction module 157. Tiering module 156 and prediction module 157 of FIG. 2 may be an example of tiering module 156 and prediction module 157 of FIG. 1A.

One or more of the devices, modules, storage areas, or other components of computing system 202 may be interconnected to enable inter-component communications (physically, communicatively, and/or operatively). In some examples, such connectivity may be provided through communication channels (e.g., communication channels 212), which may represent one or more of a system bus, a network connection, an inter-process communication data structure, or any other method for communicating data.

Prediction module 157 may include one or more ML models 234 which may be stored on storage system 105, such as described above. Prediction module 157 may generate ML model 234 through various training techniques, including supervised, unsupervised learning techniques, utilizing training data such as data access record 144, including any classifications of data, data access types, access times, or other data of data access record 144. Prediction module 157 may execute various machine learning algorithms (e.g., Naive Bayes, support vector matrix, random forest, linear regression) to train an ML model 234. In some examples, ML model 234 may be a statistical model such as a Markov chain based prediction model. Other examples of ML model 234 include ML models that apply k nearest neighbors (kNN), boosting, k-means, support vector machines (SVM), and Bayesian inference algorithms or techniques. In some examples, prediction module 157 may perform supervised or unsupervised reinforcement learning techniques to generate ML model 234 that, when applied by prediction module 157, generates a prediction of future data access such as at a predicted time. ML model 234 may be trained or retrained utilizing training data including a grade or indication of the accuracy of prior future data access predictions ML model 234 generated as compared to actual data access by users, such as to improve ML model 234.

One or more processors 213 of computing system 202 may implement functionality and/or execute instructions associated with computing system 202 or associated with one or more modules illustrated in FIG. 2 and described below. One or more processors 213 may be, may be part of, and/or may include processing circuitry that performs operations in accordance with one or more aspects of the present disclosure. Examples of processors 213 include microprocessors, application processors, display controllers, auxiliary processors, one or more sensor hubs, and any other hardware configured to function as a processor, a processing unit, or a processing device. Computing system 202 may use one or more processors 213 to perform operations in accordance with one or more aspects of the present disclosure using software, hardware, firmware, or a mixture of hardware, software, and firmware residing in and/or executing at computing system 202.

One or more communication units 215 of computing system 202 may communicate with devices external to computing system 202 by transmitting and/or receiving data, and may operate, in some respects, as both an input device and an output device. In some examples, communication units 215 may communicate with other devices over a network. In other examples, communication units 215 may send and/or receive radio signals on a radio network such as a cellular radio network. In other examples, communication units 215 of computing system 202 may transmit and/or receive satellite signals on a satellite network. Examples of communication units 215 include a network interface card (e.g., such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee®, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

One or more input devices 217 may represent any input devices of computing system 202 not otherwise separately described herein. Input devices 217 may generate, receive, and/or process input. For example, one or more input devices 217 may generate or receive input from a network, a user input device, or any other type of device for detecting input from a human or machine.

One or more output devices 218 may represent any output devices of computing system 202 not otherwise separately described herein. Output devices 218 may generate, present, and/or process output. For example, one or more output devices 218 may generate, present, and/or process output in any form. Output devices 218 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more storage devices of local storage system 105 within computing system 202 may store information for processing during operation of computing system 202, such as random access memory (RAM), Flash memory, solid-state disks (SSDs), hard disk drives (HDDs), etc. Storage devices may store program instructions and/or data associated with one or more of the modules described in accordance with one or more aspects of this disclosure. One or more processors 213 and one or more storage devices may provide an operating environment or platform for such modules, which may be implemented as software, but may in some examples include any combination of hardware, firmware, and software. One or more processors 213 may execute instructions and one or more storage devices of storage system 105 may store instructions and/or data of one or more modules. The combination of processors 213 and local storage system 105 may retrieve, store, and/or execute the instructions and/or data of one or more applications, modules, or software. Processors 213 and/or storage devices of local storage system 105 may also be operably coupled to one or more other software and/or hardware components, including, but not limited to, one or more of the components of computing system 202 and/or one or more devices or systems illustrated as being connected to computing system 202.

File system manager 152 may perform functions relating to providing file system 153, as described above with respect to FIG. 1A. File system manager 152 may generate and manage file system metadata 232 for structuring file system data 230 for file system 153, and store file system metadata 232 and file system data 230 to local storage system 105.

File system metadata 232 may include tree data structures that describe objects within file system 153 and the file system 153 hierarchy, and can be used to write or retrieve objects within file system 153. File system manager 152 may interact with and/or operate in conjunction with one or more modules of computing system 202, including interface module 226 and storage manager 154.

Storage manager 154 may perform functions relating to tiering file system data for file system 153, as described above with respect to FIG. 1A. For example, storage manager 154 may store a first subset of objects 160A of a file system on a higher performance storage tire (e.g., primary storage tier 120A) and store a second subset of objects 160B of the file system on a lower performance storage tier (e.g., secondary storage tier 120B). In some examples, second subset of objects 160B may constitute backup 142. In some examples, objects 160B may be stored independent of any backup 142 as indicated by the broken line depiction of backup 142 in FIG. 2. Storage manager 154 may store file system data to storage system 115 and/or storage system 105 (not shown) as objects 160 using data chunks 264 ("chunk") and chunkfiles 262. Storage manager 154 may prefetch any of objects 160 or backups 142 on secondary storage tier 120B to primary storage tier 120A.

As noted above, storage manager 154 may deduplicate file system data included in a backup 142 against file system data that is included in one or more previous backups. For example, a second object 160 of file system 153 and included in a second backup 142 may be deduplicated against a first object 160 of file system 153 and included in a first, earlier backup 142. Storage manager 154 may remove a chunk 262 of the second object 160 and generate file system metadata 232 with a reference (e.g., a pointer) to a stored chunk of chunks 264 in one of chunkfiles 262. Stored chunk 264 in this example is an instance of a chunk stored for the first object 160. In some examples, deduplication may only occur between a subset of backups 142, for example backups 142 stored on a particular storage service 115, such to allow independent backups to exist, or to confirm to one or more policies 158.

Storage manager 154 may apply deduplication as part of a write process of writing (i.e., storing) an object 160 of file system 153 to one of backups 142 in storage system 115. Deduplication may be implemented in various ways. For example, the approach may be fixed length or variable length, the block size for the file system may be fixed or variable, and deduplication domains may be applied globally or by workload. Fixed length deduplication involves delimiting data streams at fixed intervals. Variable length deduplication involves delimiting data streams at variable intervals to improve the ability to match data, regardless of the file system block size approach being used. This algorithm is more complex than a fixed length deduplication algorithm but can be more effective for most situations and generally produces less metadata. Variable length deduplication may include variable length, sliding window deduplication. The length of any deduplication operation (whether fixed length or variable length) determines the size of the chunk being deduplicated.

In some examples, the chunk size can be within a fixed range for variable length deduplication. For instance, storage manager 154 can compute chunks having chunk sizes within the range of 16-48 KB. Storage manager 154 may eschew deduplication for objects 160 that that are less than 16 KB. In some example implementations, when data of object 160 is being considered for deduplication, storage manager 154 compares a chunk identifier (ID) (e.g., a hash value of the entire chunk) of the data to existing chunk IDs for already stored chunks. If a match is found, storage manager 154 updates metadata for object 160 to point to the matching, already stored chunk. If no matching chunk is found, storage manager 154 writes the data of object 160 to storage as one of chunks 264 for one of chunkfiles 262. Storage manager 154 additionally stores the chunk ID in chunk metadata (e.g., file system metadata 232), in association with the new stored chunk, to allow for future deduplication against the new stored chunk. In general, chunk metadata is usable for generating, viewing, retrieving, or restoring objects stored as chunks 264 (and references thereto) within chunkfiles 262, for any of backups 142, and is described in further detail below.

Each of chunkfiles 262 includes multiple chunks 264. Chunkfiles 262 may be fixed size (e.g., 8 MB) or variable size. Chunkfiles 262 may be stored using a data structure offered by a cloud storage provider for storage system 115 or storage system 105. For example, each of chunkfiles 262 may be one of an S3 object within an AWS cloud bucket, an object within AZURE Blob Storage, an object in Object Storage for ORACLE CLOUD, or other similar data structure used within another cloud storage provider storage system. Any of chunkfiles 262 may be subject to a write once, ready many (WORM) lock having a WORM lock expiration time. A WORM lock for an S3 object is known as an "object lock" and a WORM lock for an object within AZURE Blob Storage is known as "blob immutability."

The process of deduplication for multiple objects 160 over multiple backups results in chunkfiles 262 that each have multiple chunks 264 for multiple different objects 160 associated with the multiple backups. In some examples, different backups 142 may have objects 160 that are effectively copies of the same data, e.g., for an object of the file system that has not been modified. Object 160 may be represented or "stored" as metadata having references to chunks that enable object 160 to be accessed. Accordingly, description herein to a backup "storing," "having," or "including" object 160 includes instances in which the backup does not store the data for object 160 in its native form.

The initial backup and the one or more subsequent incremental backups may each be associated with a corresponding retention period and, in some cases, a data lock period for the backup. As described above, a data management policy (not shown) may specify a retention period for backup 142 and a data lock period for backup 142. A retention period for backup 142 is the amount of time for which backup 142 and chunks 264 that objects 160 of backup 142 reference are to be stored before backup 142 and chunks 264 are eligible to be removed from storage. The retention period for backup 142 begins when backup 142 is stored (the backup creation time). A chunkfile 262 containing chunks 264 that objects of backup 142 reference and that are subject to a retention period of backup 142, but not subject to a data lock period for backup 142, may be modified at any time prior to expiration of the retention period. The nature of such a modification must be such to preserve the data referenced by objects of backup 142.

A user or application associated with application system 102 may have access (e.g., read or write) to a backup 142 that is stored in storage system 115. The user or application may delete some of the data due to a malicious attack (e.g., virus, ransomware, etc.), a rogue or malicious administrator, and/or human error. The user's credentials may be compromised and as a result, the backup that is stored in storage system 115 may be subject to ransomware. To reduce the likelihood of accidental or malicious data deletion or corruption, a data lock having a data lock period may be applied to a backup.

As described above, chunkfiles 262 may represent an object 160 in a secondary storage system (shown as "storage system 115," which may also be referred to as "backup storage system 115") that conform to an underlying architecture of secondary storage system 115. Data platform 150 includes storage manager 154 that supports storing objects 160, which may constitute backups 142, in the form of chunkfiles 262, which interface with secondary storage system 115 to store chunkfiles 262 after forming chunkfiles 262 from one or more chunks 264 of data. Storage manager 154 may apply a process referred to as "deduplication" with respect to chunks 264 to remove redundant chunks and generate metadata linking redundant chunks to previously stored chunks 264 and thereby reduce storage consumed (and thereby reduce storage costs in terms of storage required to store the chunks). Though described above with respect to storage system 115, storage manager 154 may store and deduplicate objects 160 in the form of chunkfiles 262 that conform to an underlying architecture of storage system 105 in addition to storage system 115.

Storage manager 154 may cause file system data 230 to be stored in a tree data structure (e.g., file system metadata 232) and chunks 264 within chunkfiles 262 in storage system 115. Storage manager 154 may apply a deduplication process to selectively deduplicate chunks of objects within file system data 230, in accordance with one or more tiering policies 158. Storage manager 154 may generate and manage the tree data structure for generating, viewing, retrieving, or restoring any of objects 160. Storage manager 154 may generate and manage the tree data structure for generating, viewing, retrieving, or restoring objects 160 stored as chunks 264 (and references thereto) within chunkfiles 262. Stored objects 160 may be represented and manipulated using logical files for identifying chunks 264 for the objects 160.

Local storage system 105 may store a chunk table, which may be a part of file system metadata 232, that describes chunks 264. The chunk table may include respective chunk IDs for chunks 264 and may contain pointers to chunkfiles 262 and offsets within chunkfiles 262 for retrieving chunks 264 from storage system 115. Chunks 264 are written into chunkfiles 262 at different offsets. By comparing new chunk IDs to the chunk table, storage manager 154 can determine if the data already exists on the system. If the chunks already exist, data can be discarded and metadata for an object may be updated to reference the existing chunk. Storage manager 154 may use the chunk table to look up the chunkfile identifier for the chunkfile that contains a chunk.

Local storage system 105 may include a chunkfile table that describes respective physical or virtual locations of chunkfiles 262 on storage system 115, along with other metadata about the chunkfile, such as a checksum, encryption data, compression data, etc. In FIG. 2, storage manager 154 causes a tree data structure to be stored to local storage system 105. In some examples, storage manager 152 causes some or all of the tree data structure to be stored to storage system 115. Storage manager 154, optionally or in conjunction with file system manager 152, may use the tree data structure and/or file system metadata 232 to restore any of objects 160, backups 142, or both to a file system implemented by data platform 150, which may be presented by file system manager 152 to other systems.

Interface module 226 may execute an interface by which other systems or devices may determine operations of file system manager 152 or storage manager 154. Another system or device may communicate via an interface of interface module 226 to specify one or more policies 158.

System 200 may be modified to implement an example of system 190 of FIG. 1B. In the modified system 200, chunkfiles 262 may be stored to a local storage system 115 to support backups 142.

Interface module 240 of snapshot storage system 115 may execute an interface by which other systems or devices may create, modify, delete, or extend a "write once read many" (WORM) lock expiration time for any of chunkfiles 262. Interface module 240 may execute and present an API. The interface presented by interface module 240 may be a gRPC, HTTP, RESTful, command-line, graphical user, web, or other interface. Interface module 240 may be associated with use costs. One more methods or functions of the interface module 240 may impose a cost per-use (e.g., $0.10 to extend a WORM lock expiration time of chunkfiles 262).

Although the techniques described in this disclosure are primarily described with respect to a backup function performed by a storage manager of a data platform, similar techniques may additionally or alternatively be applied for an archive, replica, clone, or snapshot functions performed by the data platform. In such cases, backups 142 would be archives, replicas, clones, or snapshots, respectively.

Figure 3:
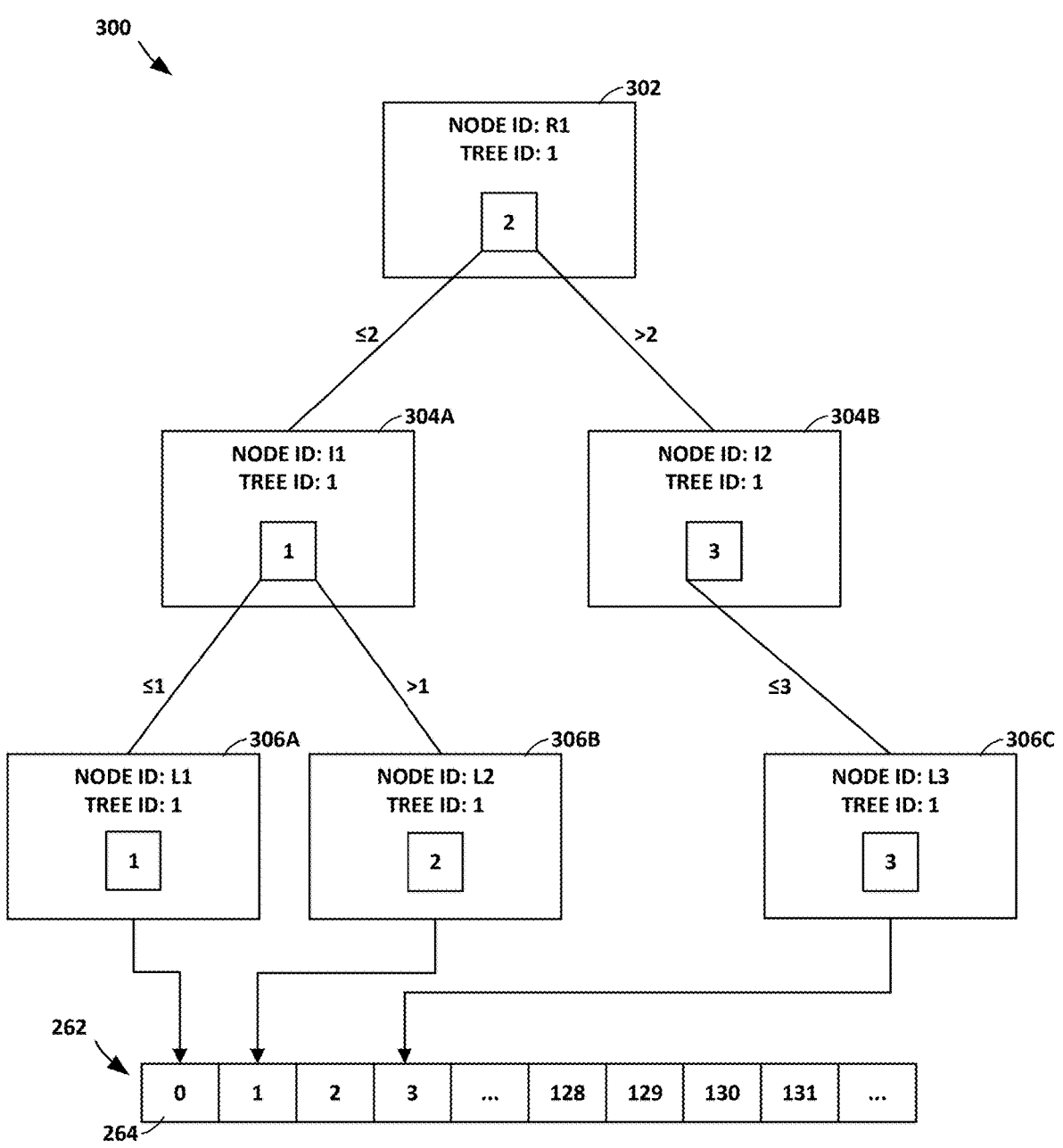
FIG. 3 is a block diagram illustrating an example tree data structure, in accordance with techniques of this disclosure.

FIG. 3 is a block diagram illustrating an example tree data structure 300 in accordance with techniques of this disclosure. Referring to FIG. 3 for example, tree data structure 300 may comprise a tree structure and include one or more root nodes 302, one or more intermediate nodes 304, and one or more leaf nodes 306 interconnected by pointers. Though illustrated as including one level of intermediate nodes 304 between root node 302 and leaf nodes 306, tree data structure 300 may include additional intermediate levels between root node 302 and leaf nodes 306 (e.g., intermediate nodes 304 with pointers to other intermediate nodes 304).

Tree data structure 300 may constitute a representation, such as a snapshot, of one or more objects 160 of a file system. Root node 302 includes one or more pointers to one or more other nodes in the snapshot. In some examples, root node 302 may form an entry point for a snapshot in that the snapshot may be retrieved by traversing tree data structure 300 starting from root node 302. Intermediate nodes 304 may be nodes to which another node points and include pointers to other nodes. Leaf nodes 306 may be a node at the bottom of tree data structure 300 and may have no pointers to other nodes. Each node 302, 304, 306 may include a checksum 308.

In some examples, each node 302, 304, 306 in tree data structure 300 may have a node identifier, tree identifier, or both represented respectively by the Node IDs and Tree IDs of FIG. 3. A node identifier may be a name that uniquely identifies a node 302, 304, 306. A tree identifier may be a string or other identifier that identifies the tree data structure (e.g., snapshot) to which the node belongs.

As described above, in some examples, root node 302 and intermediate nodes 304 may form an index through which file system data at leaf nodes 306 may be located. For instance, root node 302 and intermediate nodes 304 may include one or more node keys that indicate which pointer to traverse to locate a particular leaf node 306 (e.g., a leaf node 306 with a desired object data or metadata). In the example of FIG. 3, root node 302 has a node key of 2, intermediate node 304A has a node key of 1, and intermediate node 304B has a node key of 3. Each node key may have one or more pointers which may be selected for traversal based on a comparison between the node key and a key value. In FIG. 3 for example, for each node key, a first pointer may be traversed for key values less than or equal to the node key and a second pointer may be traversed for values greater than the node key. Key values may identify a leaf node 306 containing or referencing desired data. For example, leaf node 306A has a key value of 1, leaf node 306B has a key value of 2, and leaf node 306C has a key value of 3.

As such, to locate leaf node 306A with the key value of 1, for example, backup manager 154 may traverse the first pointer (e.g., the leftmost pointer) of root node 302 to intermediate node 304A since the key value of 1 is less than or equal to the node key of 2 at root node 302. At intermediate node 304A, backup manager 154 may traverse the first pointer (e.g., the leftmost pointer) to leaf node 306A since the key value of 1 is less than or equal to the node key of 1 at intermediate node 304A. By traversing the leftmost pointer at intermediate 304A, backup manager 154 arrives at the desired leaf node 306A with the key value of 1.

To locate leaf node 306B with the key value of 2, for example, backup manager 154 may traverse the first pointer (e.g., the leftmost pointer) of root node 302 to intermediate node 304A since the key value of 2 is less than or equal to the node key of 2 at root node 302. At intermediate node 304A, backup manager 154 may traverse the second pointer (e.g., the rightmost pointer) to leaf node 306B since the key value of 2 is greater than the node key of 1 at intermediate node 304A. To locate leaf node 306C with the key value of 3, for example, backup manager 154 may traverse the second pointer (e.g., the rightmost pointer) of root node 302 to intermediate node 304B since the key value of 3 is greater than the node key of 2 at root node 302. At intermediate node 304B, backup manager 154 may traverse the first pointer to leaf node 306C since the key value of 3 is less than or equal to the node key of 3 at intermediate node 304B.

Tree data structure 300 may store file system data comprising objects, metadata, or both. FIG. 3 illustrates an example of tree data structure 300 storing a snapshot of objects in a file system, such as objects 160 of FIGS. 1A-2. As can be seen, leaf nodes 306 of tree data structure 300 may be associated with one or more chunks 310 of chunkfile 312 for one or more objects 160. For example, leaf nodes 306 may include a pointer to one or more chunks 310 constituting one or more objects 160. As shown in the example of FIG. 3 for instance, object 160 may comprise chunk 0, chunk 1, and chunk 3 referenced by leaf nodes 306A, 306B, 306C of tree data structure 300, respectively. Though not shown, leaf nodes 306 may, in some examples, store one or more chunks 310 at the leaf nodes 306 rather than including a pointer to chunks 310. Chunks 310 and chunkfile 312 of FIG. 3 may be an example of chunks 164 and chunkfiles 162 of FIGS. 1A-2.

Additional examples and techniques for storage and retrieval of objects 160 of a file system in a tree data structure are described in "MAINTAINING AND UPDATING A BACKUP VIEW OF AN APPLICATION AND ITS ASSOCIATED OBJECTS," U.S. patent application Ser. No. 17/960,515, filed Oct. 5, 2022, the entire contents of which are hereby incorporated by reference.

FIG. 4 is a flow chart illustrating an example operation of a data platform performing prefetching of data using predictive analysis in accordance with the techniques of this disclosure. FIG. 4 is described below in the context of FIG. 1A. As shown in the example of FIG. 4, data platform 150 may store (e.g., tier) objects 160 of a file system 153 such that a first subset of the plurality of objects 160A may be stored on first storage tier 120A (e.g., primary storage tier 120A) and a second subset of the plurality of objects 160B may be stored on second storage tier 120B (e.g., secondary storage tier 120B) (402). First storage tier 120A may, in some examples, have higher performance (e.g., have a higher data transfer rate) than second storage tier 120B.

Data platform 150 may classify one or more of objects 160 into one or more classifications (404). For example, prefetch manager 155 may apply a ML model to classify objects 160 into one or more classifications (e.g., payroll data, personnel data, document data, research data). Data platform 150 may store data access record 144 for objects 160 (406). Data platform 150 may, for example, store an access time, data access type, and object identifiers or references to objects 160 in data access record 144. Data platform 150 may store one or more classifications, such as generated by prediction module 156, for objects 160 in data access record 144.

In some examples, data platform 150 may receive a data access request identifying at least one of objects 160 and store the data access request in the data access record. Data platform 150 may, for instance, receive a data access request from application system 102, mobile device 108, or client device 109. Data platform 150 may classify object 160 identified in the data access request and store the data access request in data access record 144 along with the classification of object 160 identified in the data access request.

Data platform 150 may apply a ML model to generate a prediction of future data access to objects 160 of the second subset based on the one or more classifications and data access record 144 (408). The prediction may include a predicted time for the future data access. In some examples, data platform 150 applies different ML models for classifying objects and generating predictions of future data access. In some examples, data platform 150 may train the ML model to generate the prediction of future data access with data access record 144 and the classifications.

Data platform 150 may retrieve, based on the prediction, objects 160 of the second subset from second storage tier 120B prior to the predicted time (410). In some examples, data platform 150 may determine, based on one or more performance characteristics of second storage tier 120B, an amount of transfer time for retrieving objects 160 of the second subset from second storage tier 120B. Based on the prediction, data platform 150 may retrieve objects 160 of the second subset from second storage tier 120B prior to the predicted time by retrieving objects 160 of the second subset from second storage tier 120B at a start time occurring at least the amount of transfer time before the predicted time. For example, if data platform 150 determines an amount of transfer time n (e.g., 11 hours), data platform 150 may retrieve objects 160B at a start time occurring at least n amount of time (e.g., 11 hours) before the predicted time.

Data platform 150 may store objects 160 of the second subset retrieved based on the prediction at first storage tier 160 (412). In some examples, data platform 150 may determine that objects 160 of the second subset have been accessed by users at first storage tier 120A and re-tier objects 160 responsive to determining objects 160 have been accessed, are no longer in use, or both. For instance, after storing objects 160 of the second subset at first storage tier 120A, data platform 160 may "re-tier" or return objects 160 of the second subset to second storage tier 120B. For example, data platform 150 may store objects 160 of the second subset back on second storage tier 120B and remove (e.g., delete) objects 160 of the second subset from first storage tier 120A.

With reference to FIGS. 2-3, in some examples, objects 160 may be stored as chunks 264, such as in chunkfiles 262. As such, data platform 150 may retrieve objects 160 of the second subset from second storage tier 120B prior to the predicted time by traversing tree data structure 300 representing a snapshot of objects 160 of the second subset to retrieve chunks 264 storing data for objects 160 of the second subset.

Figure 5:
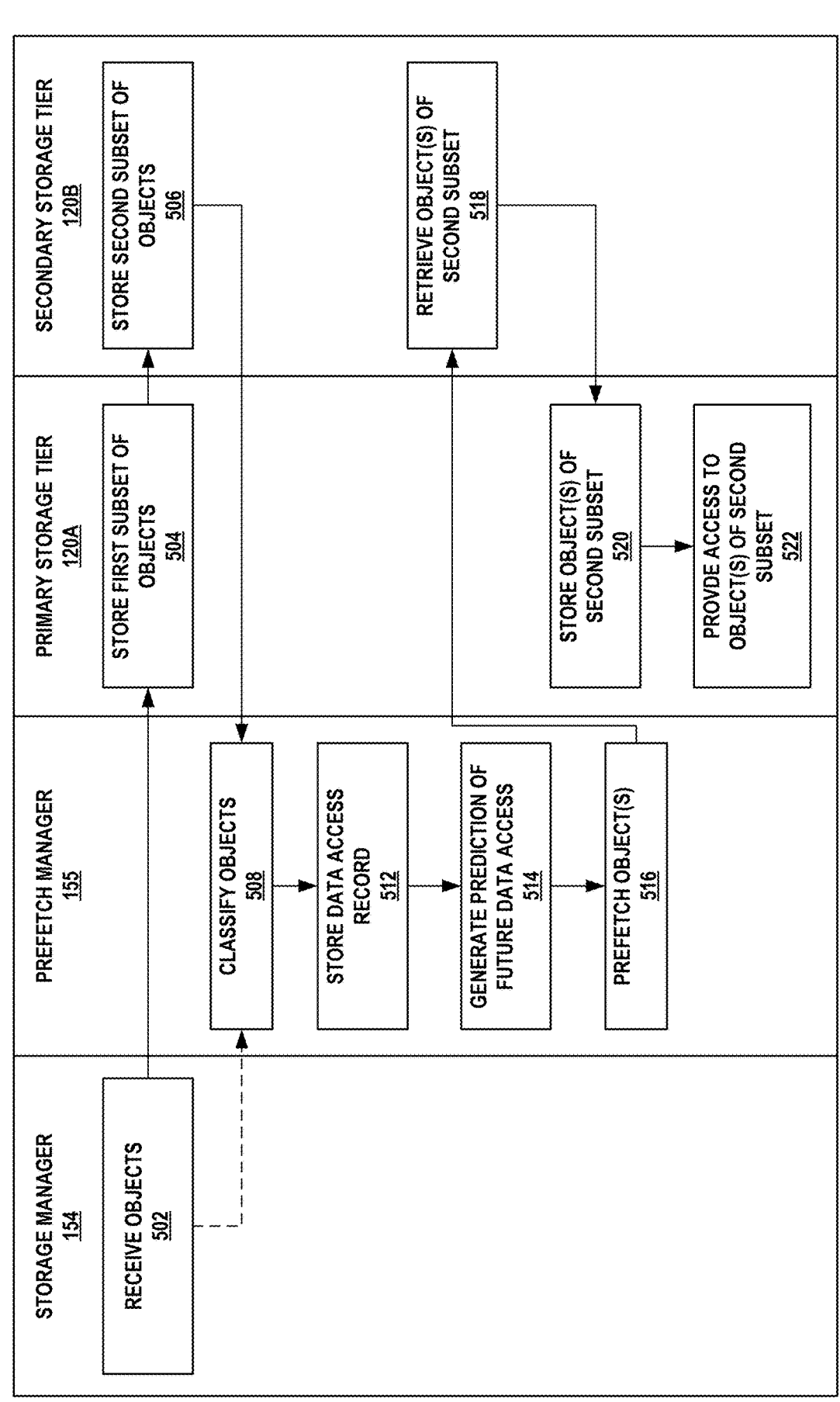
FIG. 5 is a conceptual diagram illustrating an example of prefetching data using predictive analysis, in accordance with the techniques of this disclosure.

FIG. 5 is a conceptual diagram illustrating an example of prefetching data using predictive analysis, in accordance with the techniques of this disclosure. FIG. 5 is described below in the context of FIG. 1A. In some examples, storage manager 154 may receive objects 160 for storage by data platform 150 (502), such as in connection with one or more data access requests. For instance, application system 102 may generate a data access request including objects 160 to be written (e.g., stored by data platform 150). Storage manager 154 may tier this data by storing different subsets of the data on primary storage tier 120A and secondary storage tier 120B. For example, primary storage tier 120A may store a first subset of objects 160A (504) and secondary storage tier 120B may store a second subset of objects 160B (506). As described above, lower tier data (e.g., less frequently used objects 160) may be stored on secondary storage tier 120B and higher tier data (e.g., more frequently used objects 160) may be stored on primary storage tier 120A.

Prefetch manager 155 may classify objects 160 after storage at secondary storage tier 120B, primary storage tier 120A, or both (508), such as shown in FIG. 5. Prefetch manager 155 may monitor storage activity (e.g., write activity) at primary storage tier 120A, secondary storage tier 120B or both and classify objects 160 responsive to such storage activity. As shown by the broken line arrow to step 508, in some examples, prefetch manager 155 may classify objects 160 as objects 160 are received by storage manager 154. As such, in some examples, prefetch manager 155 may classify objects 160 in parallel with or independent of storage of objects 160 at secondary storage tier 120B, primary storage tier 120A, or both.

Prefetch manager 155 may store data access record 144 on storage system 105 (512). For example, prefetch manager 155 may store or add data access requests requesting access to objects 160 on secondary storage tier 120B, primary storage tier 120A, or both to data access record 144. In this manner, data access record 144 may comprise one or more data access requests received by data platform 150.

Prefetch manager 155 may generate a prediction of future data access, such as by applying a ML model trained with training data comprising data access record 144, object classifications, or both (514). In some examples, prefetch manager 155 may generate predictions periodically or as data access record 144 is created or updated. Based on the prediction, prefetch manager 155 may prefetch objects 160 of the second subset from secondary storage tier 120B (518) and store such objects 160 on primary storage tier 120A (520). In some examples, prefetch manager 155 may retrieve objects 160 of the second subset from secondary storage tier 120B such that such objects 160 of the second subset are stored on primary storage tier 120A at least by a predicted time in the prediction. In this manner, primary storage tier 120A may provide access to prefetched objects 160 (522), such as to application system 102, mobile device 108, client device 109, or various subsets thereof. Primary storage tier 120A may be capable of higher performance (e.g., a higher data transfer rate) as compared to secondary storage tier 120B.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth herein, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/ or firmware.

The invention claimed is:

1. A method comprising:
   storing, by a data platform implemented by a computing system, a plurality of objects of a file system, wherein a first subset of the plurality of objects is stored to a first storage tier and a second subset of the plurality of objects is stored to a second storage tier;
   for each object of the plurality of objects, classifying, by the data platform, the object with one or more classifications of a plurality classifications that each identifies a type of data stored as the object based at least on corresponding metadata identifying a source that created the object;
   storing, by the data platform, a data access record indicating previous instances of data access requests for each of the plurality of objects and the one or more classifications of each of the plurality of objects;
   applying, by the data platform, a machine learning model to generate a prediction of future data access to one or more objects of the second subset based at least on the one or more classifications of the data access record, wherein the prediction includes a predicted time for the future data access;
   retrieving, by the data platform and based on the prediction, the one or more objects of the second subset from the second storage tier prior to the predicted time; and
   storing, by the data platform and to the first storage tier, the one or more objects of the second subset retrieved based on the prediction.

2. The method of claim 1, further comprising training, by the data platform, the machine learning model using the one or more classifications for each of the plurality of objects and the data access record for each of the plurality of objects.

3. The method of claim 1, further comprising receiving, by the data platform, a data access request identifying at least one of the plurality of objects, wherein storing the data access record comprises storing, by the data platform, the data access request in the data access record.

4. The method of claim 3, wherein classifying the object with the one or more classifications comprises classifying, by the data platform, the at least one of the plurality of objects identified in the data access request with the one or more classifications, and wherein storing the data access record comprises storing, by the data platform, the data access request in the data access record along with the one or more classifications of the at least one of the plurality of objects identified in the data access request.

5. The method of claim 1, further comprising:

determining, by the data platform and based on one or more performance characteristics of the second storage tier, an amount of transfer time for retrieving the one or more objects of the second subset from the second storage tier;

wherein, retrieving, based on the prediction, the one or more objects of the second subset from the second storage tier prior to the predicted time comprises retrieving, by the data platform, the one or more objects of the second subset from the second storage tier at a start time occurring at least the amount of transfer time before the predicted time.

6. The method of claim 1, wherein the machine learning model is a first machine learning model, and wherein classifying the object with the one or more classifications comprises applying, by the data platform, a different second machine learning model to classify the object with the one or more classifications.

7. The method of claim 1, wherein the first storage tier has a higher data transfer rate than the second storage tier.

8. The method of claim 1, wherein the plurality of objects each comprise a plurality of chunks, and wherein retrieving, based on the prediction, the one or more objects of the second subset comprises traversing a tree data structure associated with the one or more objects of the second subset to retrieve one or more chunks of the plurality of chunks corresponding to the one or more objects of the second subset.

9. The method of claim 1, further comprising, after storing the one or more objects of the second subset at the first storage tier:

storing, by the data platform, the one or more objects of the second subset back to the second storage tier; and removing, by the data platform, the one or more objects of the second subset from the first storage tier.

10. The method of claim 9, further comprising determining, by the data platform, that the one or more objects of the second subset have been accessed, wherein storing the one or more objects of the second subset back on the second storage tier and removing the one or more objects of the second subset from the first storage tier is responsive to determining that the one or more objects of the second subset have been accessed.

11. The method of claim 1, wherein the source that created the object comprises one or more of a user, a department, or a group that created the object.

12. A computing system comprising:

a memory storing instructions; and processing circuitry, the instructions configured to cause the processing circuitry to:

store a plurality of objects of a file system, wherein a first subset of the plurality of objects is stored to a first storage tier and a second subset of the plurality of objects is stored to a second storage tier;

for each object of the plurality of objects, classify the object with one or more classifications of a plurality classifications that each identifies a type of data stored as the object based at least on corresponding metadata identifying a source that created the object;

store a data access record indicating previous instances of data access requests for each of the plurality of objects and the one or more classifications of each of the plurality of objects;

apply a machine learning model to generate a prediction of future data access to one or more objects of the second subset based at least on the one or more classifications of the data access record, wherein the prediction includes a predicted time for the future data access;

retrieve, based on the prediction, the one or more objects of the second subset from the second storage tier prior to the predicted time; and store, to the first storage tier, the one or more objects of the second subset retrieved based on the prediction.

13. The computing system of claim 12, wherein the instructions are further configured to cause the processing circuitry to train the machine learning model using the one or more classifications for each of the plurality of objects and the data access record for each of the plurality of objects.

14. The computing system of claim 12, wherein the instructions are further configured to cause the processing circuitry to receive a data access request identifying at least one of the plurality of objects, wherein to store the data access record the processing circuitry further executes the instructions to store the data access request in the data access record.

15. The computing system of claim 14, wherein, to classify the object with the one or more classifications, the instructions are configured to cause the processing circuitry to classify the at least one of the plurality of objects identified in the data access request with the one or more classifications, and wherein, to store the data access record, the instructions are configured to cause the processing circuitry to store the data access request in the data access record along with the classification one or more classifications of the at least one of the plurality of objects identified in the data access request.

16. The computing system of claim 12, wherein the instructions are further configured to cause the processing circuitry to:

determine, based on one or more performance characteristics of the second storage tier, an amount of transfer time for retrieving the one or more objects of the second subset from the second storage tier;

wherein, to retrieve, based on the prediction, the one or more objects of the second subset from the second storage tier prior to the predicted time, the instructions are configured to cause the processing circuitry to retrieve the one or more objects of the second subset from the second storage tier at a start time occurring at least the amount of transfer time before the predicted time.

17. The computing system of claim 12, wherein the machine learning model is a first machine learning model, and wherein, to classify the object with the one or more classifications, the instructions are configured to cause the processing circuitry further executes the instructions to apply a different second machine learning model to classify the object with the one or more classifications.

18. The computing system of claim 12, wherein the instructions are further configured to cause the processing circuitry to, after storing the one or more objects of the second subset at the first storage tier:

store the one or more objects of the second subset back on the second storage tier; and remove the one or more objects of the second subset from the first storage tier.

19. The computing system of claim 18, wherein the instructions are further configured to cause the processing circuitry to determine that the one or more objects of the second subset have been accessed, wherein storing the one or more objects of the second subset back on the second storage tier and removing the one or more objects of the second subset from the first storage tier is responsive to determining that the one or more objects of the second subset have been accessed.

20. A computer-readable storage medium comprising instructions that, when executed, cause processing circuitry of a computing system to:

store a plurality of objects of a file system, wherein a first subset of the plurality of objects is stored to a first storage tier and a second subset of the plurality of objects is stored to a second storage tier;

for each object of the plurality of objects, classify the object with one or more classifications of a plurality classifications that each identifies a type of data stored as the object based at least on corresponding metadata identifying a source that created the object;

store a data access record indicating previous instances of data access requests for each of the plurality of objects and the one or more classifications of each of the plurality of objects;

apply a machine learning model to generate a prediction of future data access to one or more objects of the second subset based at least on the one or more classifications of the data access record, wherein the prediction includes a predicted time for the future data access;

retrieve, based on the prediction, the one or more objects of the second subset from the second storage tier prior to the predicted time; and store, to the first storage tier, the one or more objects of the second subset retrieved based on the prediction.

* * * * *